March 11, 1924.
J. H. CHRISTENSEN
MULTICOLOR SCREEN AND METHOD OF PRODUCING THE SAME
Filed May 18, 1921
1,486,635
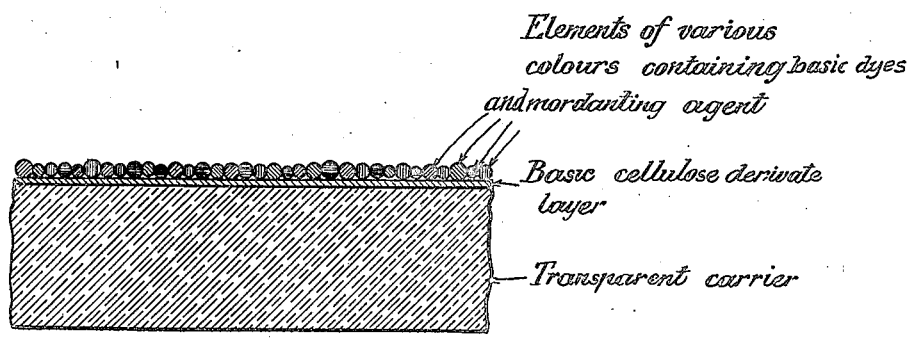

Patented Mar. 11, 1924.

1,486,635

UNITED STATES PATENT OFFICE.

JENS HERMAN CHRISTENSEN, OF HOLTE, DENMARK.

MULTICOLOR SCREEN AND METHOD OF PRODUCING THE SAME.

Application filed May 18, 1921. Serial No. 470,699.

(GRANTED UNDER THE PROVISIONS OF THE ACT OF MARCH 3, 1921, 41 STAT. L., 1313.)

*To all whom it may concern:*

Be it known that I, JENS HERMAN CHRISTENSEN, a subject of the King of Denmark, residing at Holte, Denmark, have invented a new and useful Improvement in Multicolor Screens and Methods of Producing the Same; and I do hereby declare the following to be a full, clear, and exact description of the same.

This invention relates to a method of producing multicolor screens for use in photography.

An object of the invention is to provide a multicolor screen which has a great clearness and brilliancy.

Another object is to provide a multicolor screen which is resistant to water and aqueous solutions.

A further object is to provide a multicolor screen by means of coloured liquids containing dyes and a mordant in admixture with a suitable substance which prevents precipitation of said dyes and said mordant before the elements have been applied to an underlayer.

A still further object is to provide a multicolor screen which has an underlayer provided with a coating of a cellulose derivate.

The drawing illustrates diagrammatically, a screen formed in accordance with the invention.

It has been proposed to make multicolor screens by finely dividing or comminuting coloured liquids, say by atomization or emulsification, and then applying the coloured particles to an underlayer, such as a glass plate or a film, whereafter the layer is dried. It has also been proposed to mordant the dyes to avoid diffusion of the differently coloured particles into each other. However such mordanting affords a decrease in brilliancy and clearness of the multicolor screen due to the complete or partial precipitation of the dyes in the form of opaque particles.

It is a well known fact that when an aqueous solution of tannic acid is mixed with an aqueous solution of a basic dye, these agents will precipitate each other. If, however, the water, as solvent, is partially substituted by an alcohol such as methyl alochol or ethyl alcohol no precipitation will take place. Further it is known that when a solution of tungstic acid, molybdic acid or phospho-tungstic acid is mixed with a solution of a basic dye, a precipitation will take place, but if the liquids are rendered basic, as by addition of a small quantity of ammonia, the mixing of said solutions will result in a limpid, colored liquid without any precipitation. According to the invention such limpid coloured liquids containing both a dye and a mordant but in form in which said agents do not precipitate each other are now comminuted in any well known manner, preferably through emulsifying. When the particles in any well known manner have been caused to adhere to the underlayer they are dried in any suitable manner. It is found that the dyes in said coloured tannin particles have been mordanted without precipitation. When certain other particles are used, such as coloured basic particles of tungstic acid, the mordanting is attained by a subsequent treatment as by an acid either in solution or in the form of vapor. If desired, the coloured screen thus produced may be varnished and then it is ready for use. Besides the dye or several dyes and the mordant or several mordants the particles also may contain inert substances, such as gum-arabic, dextrin, albumin or the like.

To cause the particles produced by emulsifying coloured liquids with a suitable material such as dammar varnish to adhere to the underlayer it is common practice to provide said underlayer with a cover or coating of basic character, such as gelatin with an admixture of borax, or sodium silicate. The particles which by the emulsification have been covered with a varnish substance showing an acid reaction will adhere to a such alkaline reacting underlayer. According to the present invention having for one of its objects to provide a color which is particularly resistant against water and aqueous solutions, this alkaline coating is preferably substituted by another coating which, as well as the particles themselves is resistant against water. This purpose is obtained by substituting for said gelatin coating or the like a coating consisting of or containing a basic cellulose derivate, which may be produced by applying collodion in which a small quantity of a soap, say sodium oleate is dissolved to the surface that is to be coated.

In the accompanying drawing the single figure is a diagrammatic sectional view on an exaggerated scale of a multicolor screen produced according to the method forming the object of the invention. The various parts are designated by self explanatory legends.

I desire to secure the following by Letters Patent:—

1. The method of producing multicolor screens consisting in comminuting various liquids each containing at least one dye, at least one mordant, and a substance which will prevent precipitation of the said dyes by the said mordants, causing the coloured elements thus formed to adhere to an underlayer and causing the mordanting of the said dyes to take place.

2. The method of producing multicolor screens consisting in comminuting various liquids each containing at least one dye, and at least one mordant, and a substance which will prevent precipitation of the said dyes by the said mordants, causing the colored elements thus formed to adhere to an underlayer consisting of a cellulose derivate with an addition of a basic agent and causing the mordanting of the said dyes to take place.

3. A multicolor screen comprising an underlayer and screen elements consisting of limpid particles containing dyes and mordant.

In testimony whereof I have affixed my signature in presence of two witnesses.

JENS HERMAN CHRISTENSEN.

Witnesses:
VIGGO BLOM,
C. V. HÖGSTED.